(12) United States Patent
Shibuya

(10) Patent No.: US 6,981,800 B2
(45) Date of Patent: Jan. 3, 2006

(54) WHEEL DRIVE UNIT

(75) Inventor: Eishi Shibuya, Fujisawa (JP)

(73) Assignee: NSK Ltd., Tokyo (JP)

( * ) Notice: Subject to any disclaimer, the term of this patent is extended or adjusted under 35 U.S.C. 154(b) by 123 days.

(21) Appl. No.: 10/474,228

(22) PCT Filed: Apr. 1, 2002

(86) PCT No.: PCT/JP02/03263

§ 371 (c)(1),
(2), (4) Date: Feb. 18, 2004

(87) PCT Pub. No.: WO02/081232

PCT Pub. Date: Oct. 17, 2002

(65) Prior Publication Data

US 2004/0131295 A1    Jul. 8, 2004

(30) Foreign Application Priority Data

Apr. 4, 2001 (JP) ............................. 2001-106001
May 21, 2001 (JP) ............................. 2001-151361

(51) Int. Cl.
F16C 32/00 (2006.01)
B60B 27/00 (2006.01)

(52) U.S. Cl. ...................................... 384/544; 464/182

(58) Field of Classification Search ................ 384/544, 384/589; 301/105.1, 124.1, 126; 464/178, 464/179, 182, 901, 904, 906
See application file for complete search history.

(56) References Cited

U.S. PATENT DOCUMENTS

| 4,881,842 | A | 11/1989 | Farrell et al. | |
|---|---|---|---|---|
| 5,674,011 | A | 10/1997 | Hofmann et al. | |
| 5,853,250 | A | 12/1998 | Krude et al. | |
| 6,135,571 | A | 10/2000 | Mizukoshi et al. | |
| 6,286,909 | B1 | 9/2001 | Mizukoshi et al. | |
| 6,780,114 | B2 * | 8/2004 | Sahashi et al. | 464/906 |
| 6,800,033 | B2 * | 10/2004 | Ouchi | 464/178 |

FOREIGN PATENT DOCUMENTS

| EP | 0936086 | 8/1999 |
|---|---|---|
| EP | 1125765 | 8/2001 |
| JP | 7317754 | 12/1995 |
| JP | 10264605 | 10/1998 |
| WO | 9821055 | 5/1998 |

* cited by examiner

Primary Examiner—Thomas R. Hannon
(74) Attorney, Agent, or Firm—Katten Muchin Rosenman LLP

(57) ABSTRACT

The distance $L_{15}$ in the axial direction between the surface on the axially outside end of the spline shaft 28a and the opening edge on the axially inside end of the center hole 15 of the hub 5 when the unit is installed, and more preferable the distance $L_{16}$ in the axial direction between this surface on the axially outside end of the spline shaft 28a and the edge on the axially inside end of the spline hole 16, is greater than the distance $L_{18}$ that the tripod 21 of the constant-velocity joint 18 on the differential side can move inward in the axial direction when installed in the automobile. Therefore, it is possible to prevent the spline shaft 28 from falling out of the center hole 15 even when the connection member 3 is damaged, and to maintain the spline connection between the spline shaft 28 and the spline hole 16.

3 Claims, 3 Drawing Sheets

WHEEL DRIVE UNIT

TECHNICAL FIELD OF THE INVENTION

The present invention is related to a wheel drive unit which is used for supporting a wheel such that it rotates freely with respect to a suspension, and for transmitting output from a differential gear to the wheel. This kind of wheel drive unit comprises a rolling-bearing unit for supporting the wheel, a constant-velocity joint unit and a connection member, so as to support the driven wheels that are supported by an independent suspension {front wheels for a FF automobile (Front engine, Front-wheel drive automobile), or the rear drive wheels for a FR automobile (Front engine, Rear-wheel drive automobile) or RR automobile (Rear engine, Rear-wheel drive automobile), or all the wheels for a 4WD automobile (Four-wheel drive automobile) such that they rotate freely with respect to the suspension, as well as to rotate and drive the aforementioned driven wheels.

BACKGROUND TECHNOLOGY OF THE INVENTION

In order to support the wheels such that they can rotate freely with respect to the suspension, various kinds of rolling-bearing units, which comprise an outer race and inner race that rotate freely by way of rolling elements, are used. Also, the rolling-bearing unit for supporting the driven wheels on the independent suspension is combined with a constant-velocity joint unit, and must be able to smoothly (maintaining constant velocity) transmit the rotation of the drive shaft to the aforementioned driven wheels, even when there is relative displacement between the differential gear and the driven wheels, or when a steering angle is applied to the wheels. A rolling-bearing unit, or so called fourth-generation hub unit, that can be combined with this kind of constant-velocity joint unit and which can be made to be relatively compact and lightweight has been known as disclosed in Japanese Patent Publication No. Toku Kai Hei 7-317754, Japanese Patent Publication No. Toku Kai Hei 10-264605, U.S. Pat. No. 5,674,011 and U.S. Pat. No. 5,853,250. None of these improved rolling-bearing units use a nut that would increase the weight, so it is possible to reduce the unspringing weight of the rolling-bearing unit for wheel support and make it more lightweight. Also, it is becomes more difficult for the reaction force from vibration of the automobile due to unevenness of the road to be transmitted to the vehicle body, and thus it is possible to improve the performance of the automobile such as riding comfort and driving stability.

In the case of the construction disclosed in Japanese Patent Publication No. Toku Kai Hei 7-317754, there is a hub having a pair of elements such that they are divided into an outside and inside in the axial direction and such that they are fitted and welded together. (The axially outside is toward the outside in the axial direction when the bearing unit is installed in the automobile, and is the left side in the drawings. Similarly, the axially inside is toward the center of the automobile and is the right side in the drawings.) In this first example of prior art construction, due to the heat during welding, it is possible for the shape of the inner-ring raceway portion that is formed around the outer peripheral surface of either one of the pair of elements to become deformed, or for the strength of this inner-ring raceway portion to decrease, and this it becomes impossible to sufficiently maintain durability of the rolling-bearing unit for wheel support that contains this inner-ring raceway.

In contrast, in the case of the construction disclosed in Japanese Patent Publication No. Toku Kai Hei 10-264605, U.S. Pat. No. 5,674,011 and U.S. Pat. No. 5,853,250, the rolling-bearing unit for wheel support and the constant-velocity joint are combined with each other using a spline joint such that rotation force can be freely transmitted. Also, the rolling-bearing unit for wheel support is positioned with respect to the constant-velocity joint in the axial direction by placing a connection member, which is elastically deformable in the radial direction, between and around the hub or inner race of the rolling-bearing unit for wheel support and the spline shaft section or housing section of the constant-velocity joint. (They are connected such that they cannot be separated.) In the case of this second example of prior art construction, there is no need to weld together the component members of the rolling-bearing unit for wheel support, so it is possible to adequately maintain the durability of the rolling-bearing unit for wheel support that contains the inner-ring raceway. Moreover, the connection between the rolling-bearing unit for wheel support and the constant-velocity joint is accomplished using a connection member other than the nut, it is possible to simplify the work of combining the rolling-bearing unit for wheel support and the constant-velocity joint to make a wheel drive unit, and thus it is also possible to reduce the manufacturing cost of the wheel drive unit.

In the case of the second example of prior art construction described above, it was possible to make the wheel drive unit comprising a rolling-bearing unit for wheel support combined with a constant-velocity joint more compact and lightweight, however, in order to make the wheel drive unit even more lightweight while at the same time maintain its reliability, it is desirable that improvements be made to the area of maintaining a minimum of functions even when the connection member is damaged. In other words, in order to further lighten the weight, it is desirable that the cross-sectional area of the connection member be decreased in order to make the aforementioned connection member more compact for the more light-weight unit, however, in that case, it is necessary to consider what will happen if for some reason the connection member breaks.

When the cross-sectional area of the connection member is made small, it becomes impossible to say whether or not the function of the connection member for positioning the rolling-bearing unit for wheel support and the constant-velocity joint would be lost if the connection member were to break due to corrosion or cracking. Moreover, in the case that the rolling-bearing unit becomes completely separated from the constant-velocity joint due to loss of this positioning function, there is a possibility that the components of the constant-velocity joint could fall out.

DISCLOSURE OF THE INVENTION

Taking the above problems into consideration, it is an object of this invention to provide a wheel drive unit wherein the rolling-bearing unit for wheel support is prevented from becoming completely separated from the constant-velocity joint even when the positioning function of the connection member is lost.

The wheel drive unit in a feature of this invention comprises: an outer race supported by the automobile suspension; a hub having a crimped portion formed on the axially inside end of the hub, an inner race fixed to the hub by way of the crimped section, such that a wheel is fixed on the axially outside end of the hub; the hub having a center hole formed such that at least axial part of the center hole functions as the spline hole; a spline shaft section attached to the constant-velocity joint on the wheel side; and a retaining ring provided to prevent the spline shaft from coming out of the center hole.

Particularly in the case of the wheel drive unit in the feature, the distance in the axial direction between the end surface on the axially outside end of the spline shaft and the opening on the axially inside end of the spline hole is larger than the amount of sliding inward in the axial direction of the constant-velocity joint on the wheel side due to displacement of the housing of the constant-velocity joint on the differential side and the tripod when installed in the automobile.

When there is a backlash between the sliding section of the constant-velocity joint on the differential side and the spline shaft, the backlash being related to the amount of inward movement in the axial direction of the spline shaft (this is not limited to backlash in the axial direction, but also includes backlash in the radial direction and direction of rotation as long as it is related to the amount of movement inward in the axial direction), the amount of sliding is the length in the axial direction which is the sum of the component of displacement in the axial direction due to the aforementioned backlash and the original amount of sliding of the constant-velocity joint on the differential side.

Meanwhile, the moveable distance inward in the axial direction in the present invention is the moveable distance when the retaining function of the aforementioned retaining ring is lost, so when the aforementioned backlash exists, naturally it is included in the movable distance.

In the case of the wheel-drive unit of this invention constructed as described above, the outside end of the spline shaft does not come out of the center hole even when the positioning function of the connection member is lost. Therefore, the spline shaft section does not fall out even when the positioning function of the connection member is lost. Moreover, by making the distance in the axial direction between the outside end of the spline shaft and the inside end of the spline section formed in the center hole greater than the amount of sliding inward in the axial direction of the constant-velocity joint on the wheel side, it is possible to maintain a minimum spline connection between the spline shaft and spline hole even when the aforementioned positioning function is lost. Therefore, it becomes possible to make the connection member even lighter while maintaining the reliability of the connection, and thus it is possible to further improve the performance of the automobile that is centered on riding comfort and driving stability.

DESCRIPTION OF THE PREFERRED EMBODIMENT TO WORK THE INVENTION

Figure 1:
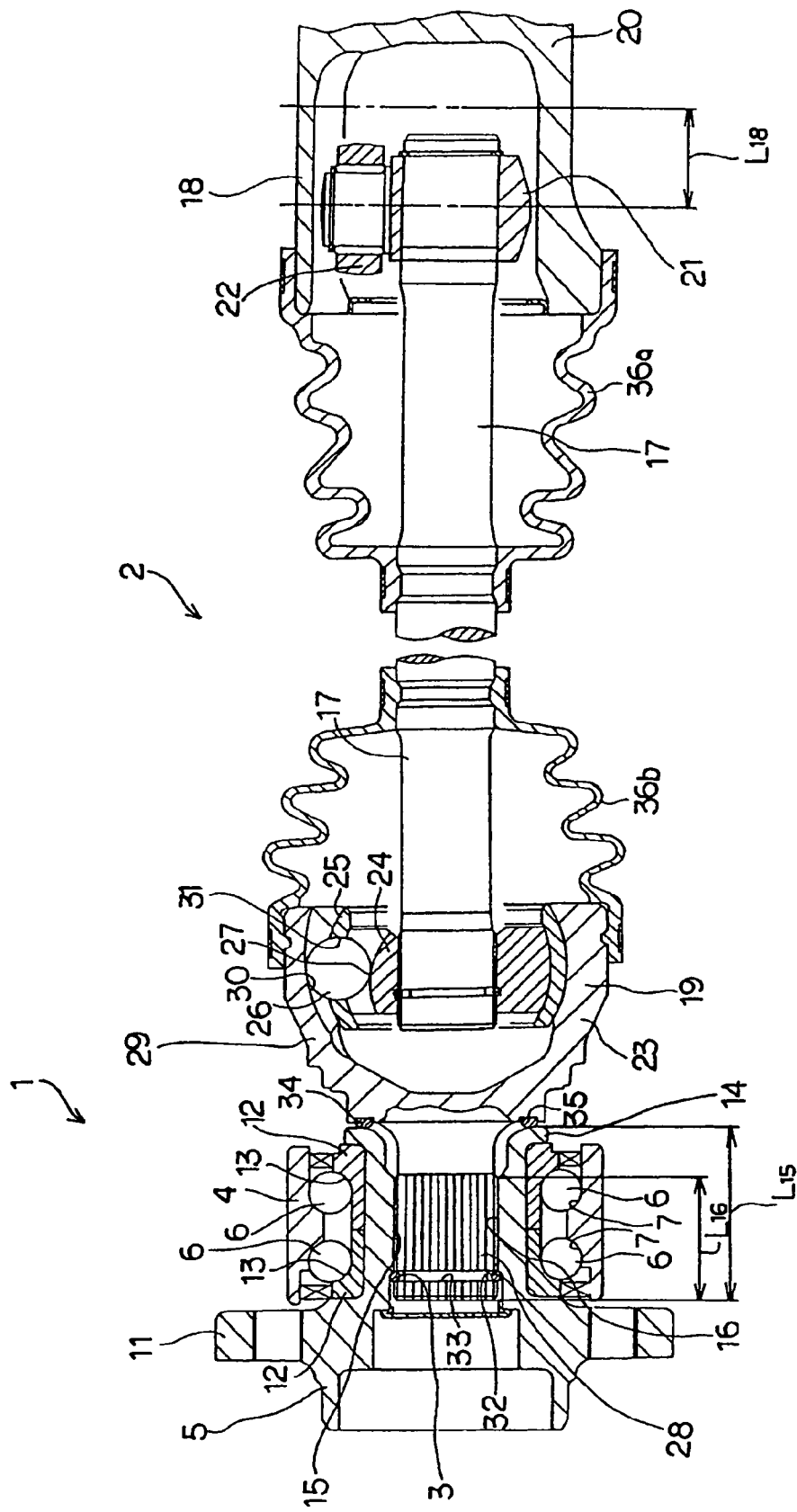
FIG. 1 is a cross sectional view of a first example of the embodiment of the wheel drive unit of the present invention.

FIG. 1 shows a first embodiment of the invention. The wheel-drive unit of this invention comprises a rolling-bearing unit 1 for wheel support, a constant-velocity joint unit 2, and a retaining ring 3 that functions as the connection member. A feature of this invention is that when the wheel-drive unit comprising the aforementioned members 1 to 3 is actually installed in the automobile, the dimensions of all of the parts are regulated such that the rolling-bearing unit 1 for wheel support does not become completely separated from the constant-velocity joint 2 even when the retaining ring 3 is damaged.

Of the aforementioned members 1 to 3, the rolling-bearing unit 1 for wheel support comprises an outer race 4, hub 5 and a plurality of rolling elements 6. The example shown in the figures shows balls as the rolling elements 6, however, in the case of a heavy automobile, tapered rollers may be used as the rolling elements. The outer race 4 has a double row of outer-ring raceways 7 formed around its inner peripheral surface, and it is supported by the suspension such that it does not rotate. In the case of this embodiment, the outer peripheral surface of the outer race 4 is a simple cylindrical shape, so that when installed on the suspension, the outer race 4 is fitted inside an installation hole 9 that is formed in a knuckle 8 (see FIG. 2). This outer race 4 may also be formed such that it has a connection flange 10 around its outer peripheral surface as shown in FIG. 3.

Also, on the outside end of the outer peripheral surface of the hub 5, in the section that protrudes outward in the axial direction further than the outside edge in the axial direction of the outer race 4, there is an installation flange 11 for supporting the wheel. Meanwhile, in the middle section and the inside end in the axial direction, in the section that faces the outer-ring raceways 7, there are inner-ring raceways 13 formed around separate inner races 12. These inner races 12 are held by a crimped section 14, which is formed by plastically deforming the inside end of the hub 5 outward in the radial direction, such that the inner rings 12 are fixed to the hub 5. The inner-ring raceway 13 on the outside in the axial direction can be formed directly around the outer peripheral surface in the middle section of the hub 5. In either case, there are a plurality of rolling elements 6 located between the outer-ring raceways 7 and inner-ring raceways 13, to support the hub 5 and inner races 12, such that they can rotate freely inside the outer race 4. A center hole 15 is formed in this hub 5 such that it extends through the inside of the hub 5 from the inside end in the axial direction to the outside end in the axial direction. Also, a female spline section is formed on the inner peripheral surface in the middle section in the axial direction of the center hole 15, so that this section is the spline hole 16.

Moreover, the constant-velocity joint unit 2 is constructed by connecting a constant-velocity joint 18 on the differential side on the inside end in the axial direction of the transmission shaft 17 and a constant-velocity joint 19 on the wheel side on the outside end of the transmission shaft 17. Of these, the constant-velocity joint 18 on the differential side has a basic construction similar to a well known tripod-type constant-velocity joint, and it comprises a housing 20 that is connected to the output section of the differential gear (not shown in the figure), and a tripod 21 that is connected and fixed to the inside end of the transmission shaft 17 by a spline connection and retaining ring, such that they are connected to each other by rollers 22 that are located at three evenly spaced locations in the circumferential direction. This constant-velocity joint 18 on the differential side transmits rotation force from the housing 20 to the transmission shaft 17 at constant velocity even when the center axis of the housing 20 is not aligned with the center axis of the transmission shaft 17. When there is displacement of the transmission shaft 17 in the axial direction, that displacement can be absorbed by allowing the tripod 21 to move in the axial direction of the housing 20. Particularly in the case of this embodiment, the amount of sliding $L_{18}$ of the constant-velocity joint 18 on the differential side according to the displacement of the tripod 21 in the axial direction of the housing 20 is regulated. This will be explained in detail later.

On the other hand, the constant-velocity joint 19 on the wheel side is similar to a well known Rzeppa-type or Barfield-type constant-velocity joint, and it comprises a drive-shaft member 23, inner joint race 24, joint retainer 25, and a plurality of joint balls 26. The outside end of the transmission shaft 17 is fixed to the inner-diameter side of the inner joint race 24 by a spline connection and retaining ring. Also, six to eight inside connection grooves 27 are formed around the outer peripheral surface of this inner joint race 24 such that their cross-sectional shape is an arc shape when the inner joint race 24 is cut with an imaginary plane orthogonal to the center axis of the inner joint race 24, and these grooves 27 are formed such that they are located at evenly spaced intervals in the circumferential direction and run in a direction orthogonal to the circumferential direction.

Moreover, the drive-shaft member 23 comprises a spline shaft section 28 on the outside end thereof and a housing 29 on the inside end thereof. Around the inner peripheral surface of the housing 29, six to eight outside connection grooves 30 having an arc-shaped cross-section are located such that they face the inside connection grooves 27, and they run in a direction orthogonal to the circumferential direction. Also, the retainer 25 for the joint is formed generally into a ring shape having an arc-shaped cross section, and it is held between the outer peripheral surface of the inner joint race 24 and the inner peripheral surface of the housing 29. At six to eight locations in the circumferential direction around this joint retainer 25, pockets 31 are formed at the locations in alignment with the inside and outside connection grooves 27, 30, and there is one joint ball 26 held in each pocket 31, or a total of six to eight balls 26. Each of the joint balls 26 can roll freely along the inside and outside grooves 27, 30 while held in the pockets 31.

The constant-velocity joint 19 on the wheel side, as described above, and the rolling-bearing unit 1 for wheel support are connected to each other by the retaining ring 3 such that they cannot come apart. In this embodiment, the spline shaft section 28 is inserted into the center hole 15 in the hub 5 to make a spline connection between the spline shaft 28 and the spline hole 16. Also, the end surface on the inside end in the axial direction of the crimped section 14 that is formed on the inside end in the axial direction of the hub 5 is brought into contact with or very near, in a facing relation, the end surface on the outside end in the axial direction of the housing 29 of the drive shaft member 23. Also, in this state, there is a retaining ring 3 placed on and between the first connection section, specifically stepped section 32 that is formed in the middle around the inner peripheral surface of the center hole 15, and the second connection section, specifically inside attachment groove 33 that is formed around the outer peripheral surface on the outside end in the axial direction of the spline shaft 28. This retaining ring 3 is made out of elastic metal wire such as spring wire or stainless spring wire and formed into a partial ring or C shape such that it can freely compress or expand elastically in the radial direction. Also, while this retaining ring 3 is fitted in the attachment groove 33, the spline shaft 28 is inserted into the center hole 15 to make a spline connection in the spline hole 16, the retaining ring 3 can be placed on and between the stepped section 32 and the inside attachment groove 33. By placing the retaining ring 3 on and between the stepped section 32 and inside attachment groove 33 in this way, the spline shaft 28 is prevented from coming out from the spline hole 16, and the constant-velocity joint 19 on the wheel side is connected to the rolling bearing unit 1 for wheel support.

The O-ring 35 that is held by a support groove 34 that is formed around the surface on the axially outside end of the housing 29 is elastically brought in contact with the surface on the axially inside end of the crimped section 14, so as to form a seal between the crimped section 14 and the housing 29. Also, there are a pair of boots 36a, 36b such that the boot 36a is located between the outer peripheral surface of a portion on the inside portion of the middle section of the transmission shaft 17 and the outer peripheral surface at the outside end of the housing 20 of the constant-velocity joint 18 on the differential side, and that the boot 36b is located between the outer peripheral surface of a portion on the outside portion of the middle section of the transmission shaft 17 and the outer peripheral surface at the inside end of the housing 29 of the constant-velocity joint 19 on the wheel side for preventing grease leakage and for preventing foreign matter from getting into the unit. These boots 36a, 36b are formed generally into a cylindrical shape having a cornice-shaped middle section.

Furthermore, in the wheel-drive unit of this embodiment, the distance $L_{15}$ in the axial direction between the end surface on the axially outside end of the spline shaft 28 and the opening edge on the axially inside end of the center hole 15 when the unit is installed, and more preferably the distance $L_{16}$ in the axial direction between the end surface on the axially outside end of the spline shaft 28 and the edge on the axially inside end of the spline hole 16 is greater than the amount of sliding $L_{18}$ of the constant-velocity joint 18 on the differential side, which is the distance that the constant-velocity joint 19 on the wheel side can move inward in the axial direction when installed in the automobile ($L_{15}$, $L_{16}$>$L_{18}$). In other words, when it is assumed that support force by the retaining ring 3 is lost, the constant-velocity joint 19 on the wheel side freely displaces inward in the axial direction corresponding to the relative displacement between the housing 20 and the tripod 21 of the constant-velocity 18 on the differential side. The distance in the axial direction that the constant-velocity joint 19 on the wheel side can move inward, is the length in the axial direction that the housing 20 and tripod 21 can move with respect to each other, or in other words the sliding amount $L_{18}$. When there is backlash in each section, this axial component of the backlash is added to the distance as described above.

When the wheel-drive unit of this embodiment is installed in the automobile, the distance $L_{18}$ in the axial direction that the constant-velocity joint 19 on the wheel side can move inward in the axial direction as described above changes corresponding to the steering angle applied to the wheels (front wheels) supported by the hub 5 or the load carried by the automobile. Generally, the larger the steering angle is the more the transmission shaft 17 is pulled outward in the axial direction, so that the distance $L_{18}$ that the constant-velocity joint 19 on the wheel side can move in the axial direction becomes larger. Also, as the load carried by the vehicle becomes larger, the height of the differential gear that is fixed to the vehicle body above the road becomes lower, and the smaller the difference between the height of the differential gear and the height of the constant-velocity joint 19 on the wheel side is, the smaller the distance $L_{18}$ in the axial direction becomes. Therefore, in the case of this embodiment, the maximum steering angle (in the state where the steering wheel is turned until it locks) is set, and this distance $L_{18}$ in the axial direction is regulated. For the front wheels of a normal automobile, the load carried by the automobile does not change the distance $L_{18}$ in the axial direction as much as the steering angle. However, when taking the load into consideration, the distance $L_{18}$ in the axial direction is regulated for a rated load, or preferably for when the load is zero or the weight of the driver. Of course, the weight of the vehicle is taken into consideration even when the load is zero. In order to keep this distance $L_{18}$ in the axial direction less than the distance $L_{15}$, $L_{16}$ in the axial direction, the dimensions of the roller 22, tripod 21 or transmission shaft of the constant-velocity joint 18 on the differential side, and the housing 20 are regulated such that they come together when there is an movement of the constant velocity joint 19 on the wheel side for displacement further than the distance $L_{18}$ in the axial direction.

In the case of the wheel-drive unit of this embodiment described above, the transmission of torque between the drive shaft 23 of the constant-velocity joint 19 on the wheel side and the hub 5 is performed by the spline connection between the spline shaft 28 and the spline hole 16. Therefore, in order to securely transmit torque between the drive shaft 23 and the hub 5, it is no longer necessary to perform processing that causes heat distortion such as build-up welding all around the unit. As a result, it is possible to maintain the durability of the components of the bearing unit, including the inner-ring raceways 13. Moreover, the work of separating the drive shaft 23 and the hub 5 in order to perform inspection and repairs can be done easily by simply removing the retaining ring 3. Also, when in operation, the outer race 4 is fastened to the suspension and the inner races 12 that are supported inside the outer race 4 by the rolling elements 6 are fixed to the hub 5 by the crimped section 14. Therefore, even when the retaining ring 3 is removed, the inner races 12 do not fall from the hub 5, and therefore the hub 5 and the wheel that is fixed to the hub 5 does not fall from the suspension.

Also, in the case of the wheel-drive unit of this embodiment, the outside end of the spline shaft 28 does not come out of the center hole 15 or spline hole 16, even when the support force by the retaining ring 3 is lost and the constant-velocity joint 19 on the wheel side moves freely in the axial direction. In other words, there is no displacement in the section of the constant-velocity joint 18 on the differential side that exceeds the distance $L_{18}$ in the axial direction, so that the amount of displacement of the constant-velocity joint 19 on the wheel side is kept within the distance $L_{18}$ in the axial direction even when the constant-velocity joint 19 on the wheel side moves freely inward in the axial direction.

Also, by making the distance $L_{15}$ in the axial direction between the end surface on the axially outside end of the spline shaft 28 and the opening edge on the axially inside end of the center hole 15 larger greater than the distance $L_{18}$ in the axial direction ($L_{15}>L_{18}$), the spline shaft 28 will at least not come out of the center hole 15. Furthermore, by making the distance $L_{16}$ in the axial direction between the end surface of the spline shaft 28 and the opening edge on the axially inside end of the spline hole 16 greater than the distance $L_{18}$ in the axial direction ($L_{16}>L_{18}$), the spline shaft 28 will not come out of the spline hole 16. Therefore, there is a minimum spline connection between the spline shaft 28 and the spline hole 16 even when the retaining ring 3 is broken, and it is possible to drive the automobile.

In this way, the spline shaft 28 does not fall out even when the support force of retaining ring 3 is lost. Therefore, it is possible to even further reduce the weight of the retaining ring 3 while still maintain reliability. In other words, it is possible to maintain the necessary minimum amount of function even when the function of retaining ring 3 is lost, so that it is possible to reduce the diameter of the retaining ring 3 and further reduce the weight of the unit. The section where the retaining ring 3 is placed is the section of the unspringing weight, and reduction in weight even by just a little improves driving performance centered around riding comfort and driving stability, so that the fact that the weight of the retaining ring 3 is reduced without making its cross-sectional area any larger than necessary (it is not necessary to greatly increase the safety factor), has a large effect in making it possible to further improve the performance of the automobile.

Figure 2:
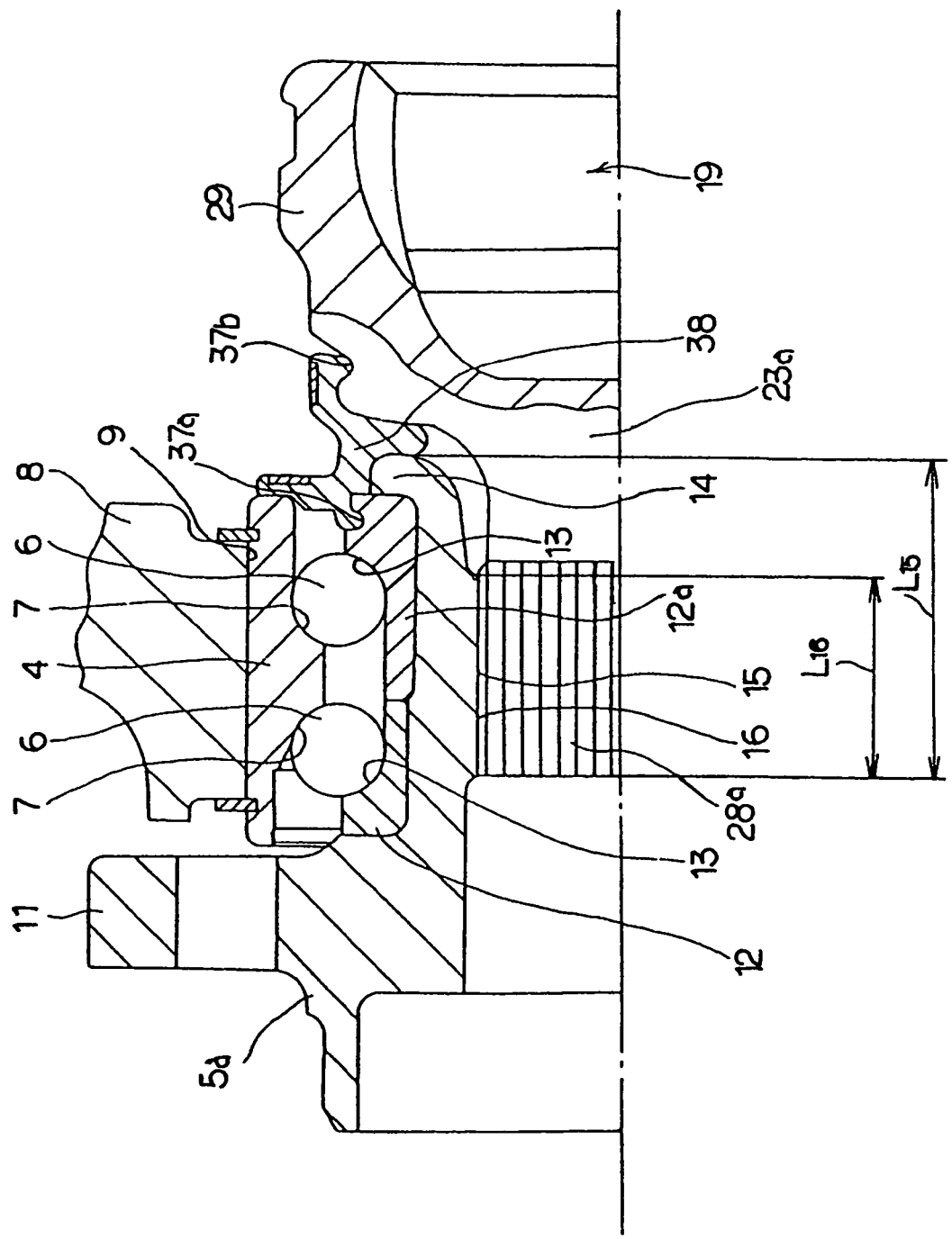
FIG. 2 is a cross sectional view of a half portion of a second example of the wheel drive unit of the present invention.
Figure 3:
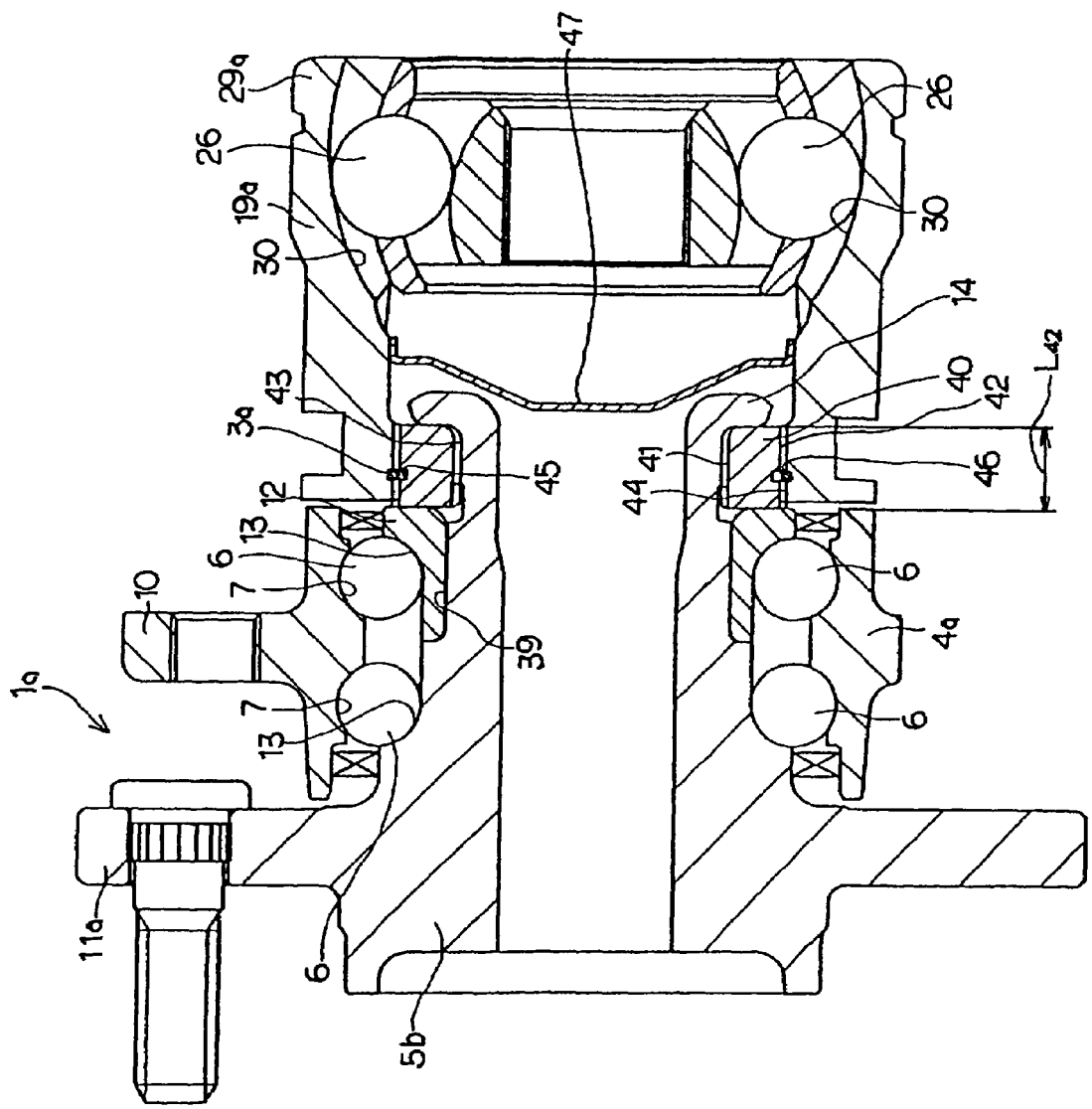
FIG. 3 is a cross sectional view of a third example of the wheel drive bearing unit of the present invention.

Next, FIG. 2 shows a second embodiment of the invention. In this embodiment as well, a spline connection is made between a spline shaft 28a that is located on the axially outside end of the drive shaft 23a and a spline hole 16 that is formed in the axially middle section in a center hole 15a in the hub 5a. Particularly in the case of this embodiment, by forming a convex-concave connection between the elastic connection member 38 and the first and second connection sections, specifically circular-shaped grooves 37a, 37b, which are respectively formed around the inner race 12a that is fastened around the inside end of the hub 5a, and around the outer peripheral surface of the housing 29 that is formed on the inside end of the drive shaft 23a, it is possible to prevent the hub 5a from being separated from the drive shaft member 23a.

In this second embodiment as well, the distance $L_{15}$ in the axial direction between the end surface on the axially outside end of the spline shaft 28a and the opening edge on the axially inside end of the center hole 15 when the unit is installed, and more preferable the distance $L_{16}$ in the axial direction between this end surface on the axially outside end of the spline shaft 28a and the edge on the axially inside end of the spline hole 16 is greater than the distance $L_{18}$ that the constant-velocity joint 19 on the wheel side can move inward in the axial direction when installed in the automobile ($L_{15}$, $L_{16}>L_{18}$) (see FIG. 1). Therefore, it is possible to prevent the spline shaft 28a from falling out even when the connection member 38 is damaged, and furthermore, it is possible maintain a minimum spline connection between the spline shaft 28a and the spline hole 26, and therefore making it possible to drive the automobile.

Next, FIG. 3 shows a third embodiment of the invention. This embodiment applies this invention to a construction the basic construction of which is disclosed in Japanese Patent Publication No. Toku Kai Hei 10-264605 and U.S. Pat. No. 5,853,250. In this embodiment, the center section of the hollow, cylindrical-shaped hub 5b is left empty without inserting the spline shaft into it, making it possible to lighten the weight of the rolling-bearing unit for wheel support 1a. When installed in the vehicle, the outer race 4a is supported by the suspension so as not to be rotated, such that a connection flange 10 is provided around the outer peripheral surface of the outer race 4a to mount the outer race 4a to the suspension. A double row of outer-ring raceways 7 is formed around the inner peripheral surface of the outer race 4a.

The hollow, cylindrical-shaped hub 5b is supported on the inside of the outer race 4a so as to be concentric with the outer race 4a. An installation flange 11a is formed around the outer peripheral surface of the hub 5b on the axially outside end so as to support the wheel, and an outside inner-raceway 13 is formed around the outer peripheral surface in the middle section of the hub 5b. Also, a small-diameter stepped section 39 is formed around the outer peripheral surface of the hub 5b near the inside end, and the inner race 12, which has the inside inner-ring raceway 13 formed around its outer peripheral surface, is fitted around this small-diameter stepped section 39. There are a plurality of rolling elements 6 located between the outer-raceway 7 and the inner-raceway 13, such that they can roll freely, and they support the hub 5b inside the outer race 4a such that it can rotate freely.

A housing 29a, which composes the outer race of a Rzeppa-type or Barfield-type constant-velocity joint 19a, is connected to the inside end of the hub 5b by way of a support ring 40. This support ring 40 is formed in a short cylindrical shape, and a radially inner female spline section 41 is formed around its inner peripheral surface, and a radially outer male spline section 42 is formed around its outer peripheral surface. The hub 5b has a radially inner spline section 43 formed around the outer peripheral surface and the support ring 40 is installed on the outer peripheral surface on the inside end of the hub 5b by making a snug spline connection between the radially inner male spline section 43 and the radially inner female spline section 41. Also, in this state, the surface on the inside end of the support ring 40 is retained by a crimped section 14 that is formed on the inside end of the hub 5b, so that the support ring 40 together with the inner race 12 is securely fixed to the inside end of the hub 5b.

On the other hand, a spline connection is made between the radially outer male spline section 42 formed on the outer peripheral surface of the support ring 40 and a radially outer female spline section 44 formed around the inner peripheral surface on the outside end of the housing 29a. Also, on the inner peripheral surface of the inside half of the housing 29a, there are a plurality of outside engagement grooves 30 that become raceways for the joint balls 26 of the Rzeppa-type or Barfield-type constant-velocity joint 19a on the wheel side. Also, as mentioned above, a spline connection is made between this radially outer female spline section 44 formed around the inner peripheral surface on the outside end of the housing 29a and the radially outer male spline section 42 formed around the outer peripheral surface of the support ring 40.

A retaining ring 3a, which is a connection member, is placed between the radially outer female spline section 44 and the outer male spline section 42 that are connected together by a spline connection, such that the housing 29a and support ring 40 is not separated from each other. In other words, the retaining ring 3a has a partial ring shape and is placed between a first engagement section, specifically an inside attachment groove 45 which is formed around the outer peripheral surface of the support ring 40, and a second engagement section, specifically an outside attachment groove 46 which is formed around the inner peripheral surface on the outside end of the housing 29a, so as to prevent the housing 29a and support ring 40 from displacement in the axial direction. Moreover, a cap 47 made by pressing steel plate is fastened in a fitting relation into the inner peripheral surface in the middle section of the housing 29a, and it closes the internal space of the constant-velocity joint 19a on the wheel side where the joint balls 26 are located, with respect to the internal space of the hub 5b that is communicated with the outside.

In the case of the construction of this third embodiment as well, when assembled, the distance $L_{42}$ in the axial direction between the second spline section, specifically axially outside end of the radially outer female spline section 44, and the first spline section, specifically axially inside end of the outer male spline section 42, is greater than the distance $L_{18}$ (FIG. 1) that the constant-velocity joint 19a on the wheel side can move inward in the axial direction when installed in the automobile ($L_{42}>L_{18}$). Therefore, it is possible to maintain a minimum spline connection between the radially outer female spline section 44 and radially outer male spline section 42, even when the retaining ring 3a is damaged, so that the automobile is kept running.

APPLICABILITY OF THE INDUSTRY

The wheel-drive unit of this invention, is constructed and functions as described above, and is able to further lighten the drive unit as well as maintain its reliability, and it also contributes to the improvement of riding comfort, power performance and fuel efficiency of the automobile.

What is claimed is:

1. A wheel drive unit to be installed in an automobile together with a constant-velocity joint provided on a wheel side, and a constant-velocity joint provided on a differential side comprising a housing and a tripod, the wheel drive unit comprising:

an outer race to be supported by an automobile suspension, a hub having an axially outside end to which an a wheel is fixed and an axially inside end on which a crimped section is formed, an inner race fixed on the hub by way of the crimped section, a spline shaft section attached to the constant-velocity joint on the wheel side, the hub having a center hole formed therein in the axial direction such that at least part of the center hole functions as a spline hole, and that the center hole is fitted to the spline shaft, and a retaining ring to prevent the spline shaft from coming out of the center hole, and the spline shaft having an end surface at an axially outside end thereof while the center hole having an opening at an axially inside end thereof, such that the distance between the end surface at the axially outside end of the spline shaft and the opening at the axially inside end of the center hole is larger than the amount of axially inward sliding of the constant-velocity joint on the wheel side due to displacement of the housing of the constant-velocity joint on the differential side and the tripod when installed in the automobile.

2. A wheel drive unit comprising a rolling bearing unit to be supported by a suspension and to support a wheel, a connection member, and a constant velocity joint unit to be connected to a differential gear having an output portion, the rolling bearing unit for supporting the wheel comprising:

an outer race having an inner peripheral surface formed with an outer-ring raceway and being not rotatable when supported by the suspension, a hub having an outer peripheral surface with a portion at an axially outside end thereof projected axially outward than the axially outside end of the outer race, and a mount flange formed on the axially outside end portion to support the wheel, the outer peripheral surface of the hub having a middle portion and an axially inside end portion, either of which is formed, directly or through an inner race, with an inner-ring raceway to face the outer raceway, the hub having a center hole for forming a spline hole in at least an axial portion thereof, and a plurality of rolling elements rotatably provided between the outer-ring raceway and the inner-ring raceway, the constant velocity joint unit comprising a constant-velocity joint provided on a wheel side, a constant-velocity joint provided on a differential side, and a transmission shaft, the constant-velocity joint on the differential side having an output portion and an input portion connected to the output portion of the differential gear, the transmission shaft having an output end portion and an input end portion connected to the output portion of the constant-velocity joint on the differential side, the constant-velocity joint on the wheel side having an output portion and an input portion connected to the output end portion of the transmission shaft, the constant-velocity joint on the wheel side having a spline shaft section formed on an axially outside end thereof to be in spline engagement with the spline hole and a housing section formed on an axially inside end thereof to be an outer ring of the constant-velocity joint, one of the hub and the inner race having a first engagement section while one of the spline shaft and the housing section having a second engagement section, and the connection member being deformable in the radial direction and placed on and between the first engagement section provided on the hub or inner race and the second engagement section provided on the spline shaft or housing section to position the hub and the constant-velocity joint on the wheel side in the axial direction, wherein the distance between the end surface at the axially outside end of the spline shaft and the opening peripheral edge at the axially inside end of the center hole is larger than the amount of axially inward movement of the constant-velocity joint on the wheel side when installed in the automobile, so that the axially outside end portion of the spline shaft portion is prevented from coming out of the center hole even when the connection member loses function of positioning the hub and the constant-velocity joint on the wheel side in the axial direction.

3. A wheel drive unit comprising a rolling bearing unit to be supported by a suspension and to support a wheel, a connection member, and a constant velocity joint unit to be connected to a differential gear having an output portion, the rolling bearing unit for supporting the wheel comprising:

an outer race having an inner peripheral surface formed with an outer-ring raceway and being not rotatable when supported by the suspension, a hub having an outer peripheral surface with a portion at an axially outside end thereof projected axially outward than the axially outside end of the outer race, and a mount flange formed on the axially outside end thereof to support the wheel, the outer peripheral surface of the hub having a middle portion and an axially inside end portion, either of which is formed, directly or through an inner race, with an inner-ring raceway to face the outer raceway, the hub having a first fitting peripheral surface formed with a first spline section, and a plurality of rolling elements rotatably provided between the outer raceway and the inner raceway, the constant velocity joint unit comprising a constant-velocity joint provided on a wheel side, a constant-velocity joint provided on a differential side, and a transmission shaft, the constant-velocity joint on the differential side having an output portion and an input portion connected to the output portion of the differential gear, the transmission shaft having an output end portion and an input spline section provided on the second fitting peripheral surface for spline engagement with the first spline section, the constant-velocity joint on the wheel side having a second fitting peripheral surface formed on an axially outside end thereof and a second input portion connected to the output end portion of the transmission shaft, and a housing section formed on an axially inside end thereof to be an outer ring of the constant-velocity joint on the wheel side, and the connection member being adapted to be resiliently deformed in the radial direction and placed on and between the first engagement section on the peripheral surface of the hub and the second engagement section on the peripheral surface of the constant-velocity joint on the wheel side to position the hub and the constant-velocity joint on the wheel side in the axial direction, wherein the distance between the axially outside end of the second spline section and the axially inside end of the first spline section is larger than the amount of axially inward movement of the constant-velocity joint on the wheel side when installed in the automobile, so that the first and second spline sections are prevented from coming out of each other even when the connection member loses function of positioning the hub and the constant-velocity joint on the wheel side in the axial direction.

* * * * *